United States Patent
Nain et al.

(10) Patent No.: US 8,700,826 B2
(45) Date of Patent: Apr. 15, 2014

(54) CONTROLLER, COMPUTER SYSTEM AND CONTROL METHOD THEREOF

(75) Inventors: Yueh-Yao Nain, Hsinchu County (TW); Wen-Pin Chu, Tainan (TW); Yu-Chang Chou, Taipei County (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 13/101,876

(22) Filed: May 5, 2011

(65) Prior Publication Data

US 2011/0289246 A1 Nov. 24, 2011

(30) Foreign Application Priority Data

May 20, 2010 (TW) .............................. 99116107 A

(51) Int. Cl.
*G06F 13/12* (2006.01)
*G06F 11/00* (2006.01)

(52) U.S. Cl.
USPC ........................................... 710/62; 702/119

(58) Field of Classification Search
USPC .......................................................... 710/62
See application file for complete search history.

(56) References Cited

U.S. PATENT DOCUMENTS

| | | | |
|---|---|---|---|
| 4,939,732 A * | 7/1990 | Okamoto et al. | 714/781 |
| 5,359,604 A | 10/1994 | Kondo et al. | |
| 5,664,123 A | 9/1997 | Lee et al. | |
| 6,336,195 B1 | 1/2002 | Shen et al. | |
| 6,732,301 B1 * | 5/2004 | Landry et al. | 714/43 |
| 6,751,569 B2 * | 6/2004 | Merkin et al. | 702/120 |
| 6,792,378 B2 * | 9/2004 | Chen et al. | 702/119 |
| 2003/0120970 A1 * | 6/2003 | Chen | 714/25 |
| 2005/0204070 A1 * | 9/2005 | Shaver et al. | 710/8 |

* cited by examiner

*Primary Examiner* — Titus Wong
(74) *Attorney, Agent, or Firm* — Muncy, Geissler, Olds & Lowe, P.C.

(57) ABSTRACT

A super I/O module for controlling at least one I/O port of a computer system is provided. The super I/O module includes a controller, a signal detector and a selector. The controller supports functions corresponding to the I/O port. The signal detector receives an input signal from the I/O port, and detects whether the input signal has an identification code. When detecting that the input signal has the identification code, the signal detector generates a selection signal according to the identification code. The selector receives the selection signal and selectively provides the input signal to the controller or a function circuit of the computer system according to the selection signal.

14 Claims, 3 Drawing Sheets

| | Identification Code |
|---|---|
| PS/2 Controller | ID0 |
| SPI Flash | ID1 |
| JTAG circuit | ID2 |
| UART | ID3 |

FIG. 2

CONTROLLER, COMPUTER SYSTEM AND CONTROL METHOD THEREOF

CROSS REFERENCE TO RELATED APPLICATIONS

This Application claims priority of Taiwan Patent Application No. 99116107, filed on May 20, 2010, the entirety of which is incorporated by reference herein.

BACKGROUND OF THE INVENTION

1. Field of the Invention

The invention relates to a super input/output (I/O) module of a computer system, and more particularly to a method for controlling the devices of a computer system by using a super I/O module.

2. Description of the Related Art

At present, data for performing a power-on process is stored in a serial peripheral interface (SPI) flash memory of computer systems. Therefore, when the updating procedure of a flash memory on a main board of a computer system fails, a maintenance engineer must open a housing of the computer system, and then de-solder the flash memory. Next, the maintenance engineer uses a recorder to update the data stored in the de-soldered flash memory. Next, the maintenance engineer solders the flash memory that has been completely updated back to the main board, and then puts back the housing of the computer system. Therefore, traditionally, the maintenance engineer must perform complicated procedures to update the flash memory. In addition, if the de-soldering or soldering of the flash memory fails, the computer system can not normally work.

Therefore, a control method is desired to control, debug or update the internal circuits of a computer system without removing a housing/case of the computer system.

BRIEF SUMMARY OF THE INVENTION

A super I/O module, a computer system and a control method thereof are provided. An embodiment of a super I/O module for controlling at least one I/O port of a computer system is provided. The super I/O module includes a controller, a signal detector and a selector. The controller supports functions corresponding to the I/O port. The signal detector receives an input signal from the I/O port and detects whether the input signal has an identification code. The signal detector generates a select signal according to the identification code when detecting that the input signal has the identification code. The selector receives the select signal and selectively provides the input signal to the controller or a function circuit of the computer system according to the select signal.

Furthermore, an embodiment of a computer system is provided. The computer system comprises at least one I/O port for receiving an input signal, a super I/O module and a function circuit. The super I/O module comprises: a controller for supporting functions corresponding to the I/O port; a signal detector for detecting whether the input signal has an identification code, and generating a select signal according to the identification code when detecting that the input signal has the identification code; and a selector. The selector selectively provides the input signal to the controller or the function circuit according to the select signal.

Moreover, an embodiment of a control method for a computer system with a super I/O chip is provided. A first input signal is received via an I/O port of the computer system, wherein the I/O port is coupled to the super I/O chip. An identification code of the first input signal is detected. The first input signal is selectively provided to the controller or the function circuit according to the detected identification code of the first input signal. The controller is implemented in the super I/O chip and supports functions corresponding to the I/O port.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 2 shows an identification code table illustrating the identification codes corresponding to various circuits of a computer system according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In a computer system, such as desktop computer, notebook computer, etc., a super Input/Output (I/O) module comprises various I/O controllers which control a PS/2 port, serial port, parallel port, and game port of the computer system to communicate with the peripheral devices of the computer system. The I/O controller, for example, can be a PS/2 port controller, a serial port controller, a parallel port controller or a game port controller. The PS/2 port controller can be used to control a keyboard and a mouse both coupled to the PS/2 port, and the parallel port controller can be used to control a printer coupled to the parallel port.

Figure 1:
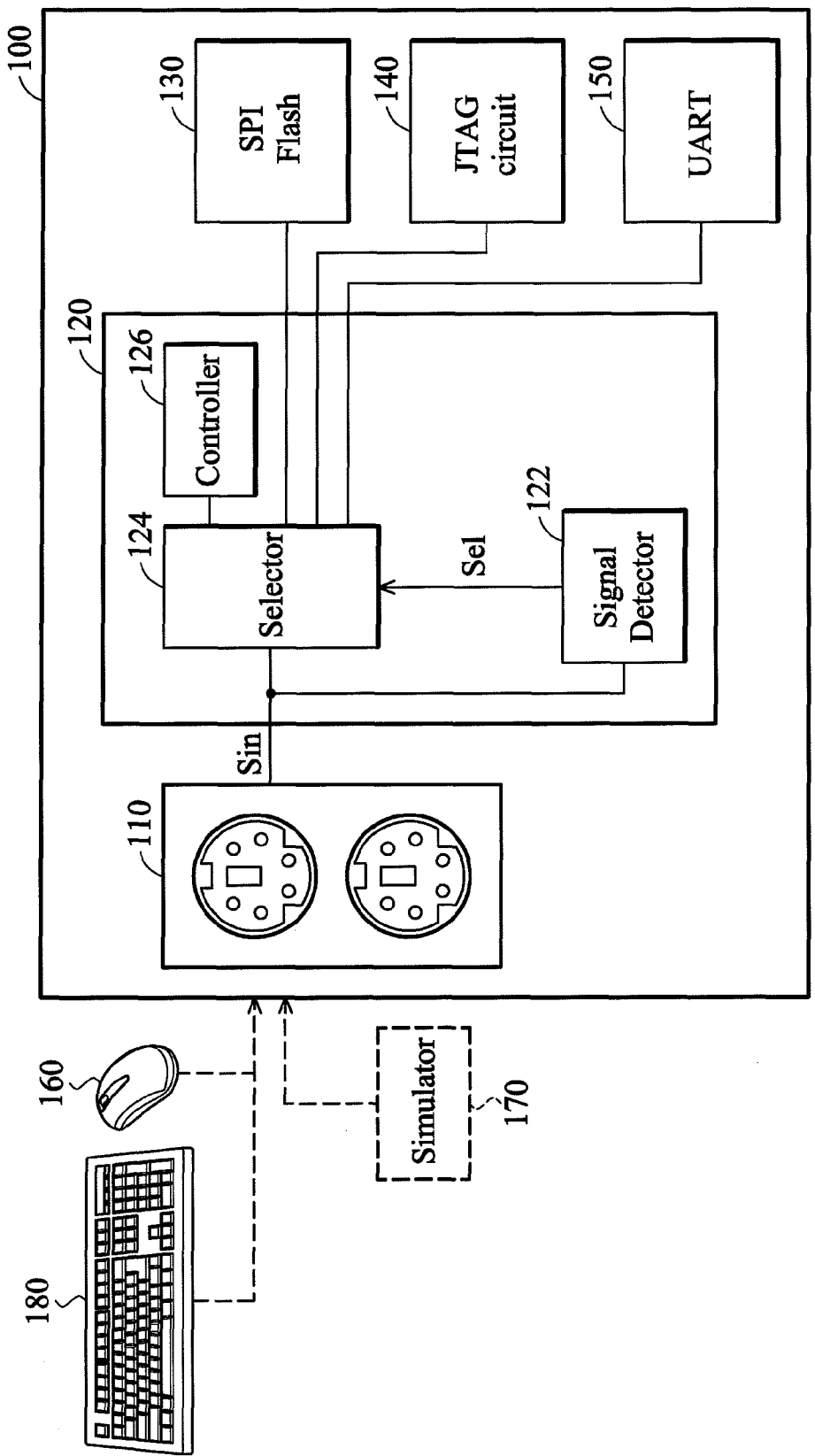
FIG. 1 shows a computer system according to an embodiment of the invention.

FIG. 1 shows a computer system 100 according to an embodiment of the invention. The computer system 100 includes an I/O port 110, a super I/O module 120, a serial peripheral interface (SPI) flash memory 130, a joint test action group (JTAG) circuit/bus 140 and a universal asynchronous receiver/transmitter (UART) 150. The super I/O module 120 can be implemented in a super I/O chip, wherein the super I/O module 120 includes a signal detector 122, a selector 124 and a controller 126 corresponding to the I/O port 110. For example, the I/O port 110 can be a PS/2 port coupled to a keyboard 180 and a mouse 160, and the controller 126 can be a PS/2 port controller for receiving the signals (e.g. the data signal DATA and the clock signal CLK) from the keyboard 180 and the mouse 160 and performing subsequent processes. In the embodiment, the PS/2 port is used as an example for description, and does not limit the invention. In another embodiment, the I/O port 110 can be another type of I/O port, such as the serial port, parallel port, or game port, and the controller 126 can be another type of I/O port controllers, such as the serial port controller, parallel port controller, or game port controller according to the type of the I/O port 110. The central processing unit (CPU), north bridge chip, south bridge chip, and power module of the computer system 100 is not be described in detail herein in order to simplify descriptions.

In FIG. 1, the signal detector 122 determines whether an input signal Sin has a specific identification code when receiving the input signal Sin via the I/O port 110. For example, if a simulator 170 is connecting to the I/O port 110, the simulator 170 may provide a signal with a specific identification code to the computer system 100 via the I/O port 110, so as to control, debug, record or update the circuits within the computer system 100. In the embodiment, the simulator 170 may control the SPI flash memory 130, the JTAG circuit 140 and the UART 150 via the I/O port 110. If the mouse 160 and/or the keyboard 180 is connected to the I/O port 110, the signal received via the I/O port 110 does not have the specific identification code. Thus, the signal detector 122 may not provide a select signal Sel to the selector 124. In such a case, the selector 124 may keep the last function option of control, debug, record or update without performing any switching of the function option.

Referring to FIG. 2, FIG. 2 shows an identification code table illustrating the identification codes corresponding to various circuits of a computer system according to an embodiment of the invention.

Referring to FIG. 1 and FIG. 2 together, when the simulator 170 wants to update the SPI flash memory 130 via the I/O port 110, the simulator 170 can provide the input signal Sin with an identification code ID1 to the super I/O module 120. Next, the signal detector 122 determines whether the input signal Sin has a specific identification code, and then identifies that the identification code of the input signal Sin is ID1. Subsequently, the signal detector 122 generates the signal Sel according to the identification code ID1 to control the selector 124, so as to provide the input signal Sin to the SPI flash memory 130 but not provide the input signal Sin to the other circuits (e.g. the controller 126 etc.). In one embodiment, the selector 124 can be a de-multiplexer. Therefore, before a next identification code is identified by the signal detector 122, the selector 124 may sequentially transmit the signals from the simulator 170 to the SPI flash memory 130. Thus, a user can update the data (e.g. Basic Input Output System (BIOS)) of the SPI flash memory without removing a housing of the computer system 100. Similarly, the simulator 170 may also provide the input signal Sin with an identification code ID2 to the super I/O module 120. Next, the signal detector 122 may identify that the identification code is ID2, and then may control the selector 124 to provide the signals from the I/O port 110 to the JTAG circuit 140, so as to debug a portion of circuits of the computer system 100 via the JTAG circuit 140. Moreover, the simulator 170 may also provide the input signal Sin with an identification code ID3 to the super I/O module 120. Next, the signal detector 122 may identify that the identification code is ID3, and then may control the selector 124 to provide the signals from the I/O port 110 to the UART 150 for communication. The JTAG circuit 140 may also be implemented in the super I/O module 120 for debugging a microcontroller (not shown) of the super I/O module 120. Similarly, the UART 150 can also be implemented in the super I/O module 120.

In one embodiment, the simulator 170 may provide a specific check code) to the super I/O module 120 prior to the specific identification code. The specific check code, for example, can be a cyclic redundancy check (CRC) code for speeding up the determination of the specific identification code for the signal detector 122, wherein a length of the specific check code is determined according to actual applications. For example, if the specific check code is a 64 k bits CRC16 code, the signal detector 122 may receive the CRC16 code first, and then may further detect the input signal Sin, so as to identify the identification code of the input signal Sin.

Therefore, the identification code of the input signal Sin does not have to be detected by the signal detector 122 when the CRC16 code has not been received. In FIG. 1, the super I/O module 120, the SPI flash memory 130, the JTAG circuit 140 and the UART 150 can be implemented in different chips. However, in one embodiment, the circuits going to be controlled by simulator 170 and the super I/O module 120 can be implemented in the same chip.

It is to be noted, after completing the control, debug, record or update process of the other circuits, the simulator 170 may provide the input signal Sin with an identification code ID0 to the super I/O module 120 before that the simulator 170 is disconnected from the computer system 100 (or before communication between simulator 170 and computer system 100 is interrupt). Thus, the selector 124 is controlled to transmit the subsequent input signals from the I/O port 110 to the controller 126, such that the mouse 160 and/or the keyboard 180 may operate normally after connecting to the computer system 100 again.

Figure 3:
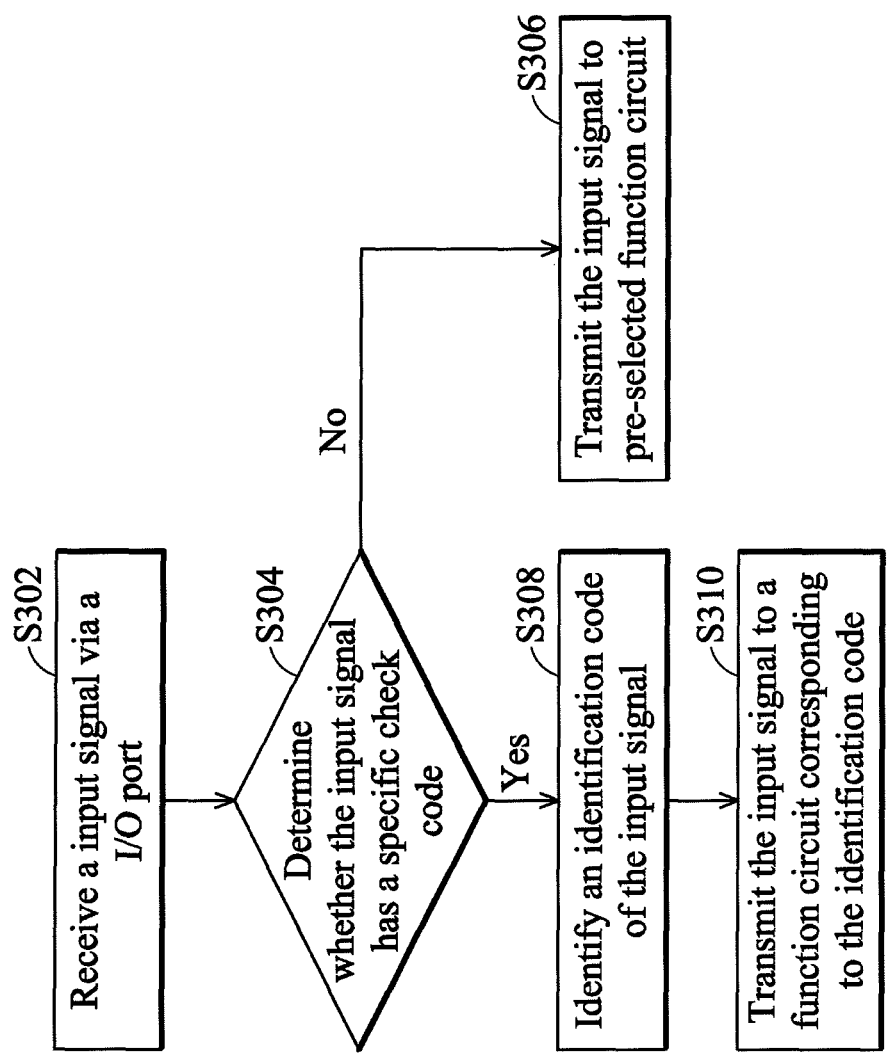
FIG. 3 shows a control method for a computer system with a super I/O chip according to an embodiment of the invention.

FIG. 3 shows a control method for a computer system with a super I/O chip according to an embodiment of the invention. First, in step S302, an input signal Sin is received via an I/O port of the computer system (e.g. 110 of FIG. 1). Next, in step S304, the input signal Sin is detected by a signal detector (e.g. 122 of FIG. 1) within the super I/O chip, so as to determine whether the input signal Sin has a specific check code. If no, a selector (e.g. 124 of FIG. 1) of the super I/O chip may directly transmit the input signal Sin to a pre-selected function circuit for subsequent processing (step S306). On the contrary, if the input signal Sin has the specific check code, the signal detector of the super I/O chip may further identify an identification code of the input signal Sin (step S308). Next, in the super I/O chip, the signal detector may control/switch the selector according to the identification code, such that the selector may transmit the input signal Sin to a function circuit corresponding to the identification code for subsequent processing (step S310).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated circuit for controlling at least one I/O port of an electronic system, comprising: a controller, having a function corresponding to the I/O port; a signal detector, receiving an input signal generated by an external electronic device through the I/O port and detecting whether the input signal from the external electronic device has an identification code, wherein the signal detector generates a select signal according to the identification code when detecting that the input signal has the identification code; and a selector coupled to the I/O port, receiving the select signal and selectively providing the input signal to the controller or a function circuit of the electronic system according to the select signal, wherein when the input signal is directed to the function circuit, the function circuit is assessed by the external electronic device; when the input signal is directed to the controller, the controller processes the input signal to execute a corresponding operation; wherein the signal detector determines whether the input signal has a specific check code, and when the input signal has the specific check code, the signal detector further determines whether the input signal has the identification code, so as to generate the select signal; and wherein when the function circuit is accessed by the external electronic device, the external electronic device controls, debugs, records, or updates the function circuit.

2. The integrated circuit as claimed in claim 1, wherein the controller is one of a serial port controller, a parallel port controller, a PS/2 port controller and a game port controller for controlling the I/O port corresponding to the controller.

3. The integrated circuit as claimed in claim 2, wherein the function circuit is a serial peripheral interface (SPI) flash memory, a joint test action group (JTAG) circuit or a universal asynchronous receiver/transmitter (UART) of the electronic system.

4. A system, comprising: at least one I/O port, receiving an input signal; an integrated circuit, comprising: a controller, having a function corresponding to the I/O port; a signal detector, detecting whether the input signal generated by an external electronic device through the I/O port has an identification code, and generating a select signal according to the identification code when detecting that the input signal has the identification code; and a selector coupled to the I/O port; and a function circuit, wherein the selector selectively provides the input signal to the controller or the function circuit according to the select signal, wherein when the input signal is directed to the functional circuit, the functional circuit is accessed by the external electronic device; when the input signal is directed to the controller, the controller processes the input signal to execute a corresponding operation; wherein the signal detector determines whether the input signal has a specific check code, and when the input signal has the specific check code, the signal detector further determines the identification code of the input signal to generate the select signal; and wherein when the function circuit is accessed by the external electronic device, the external electronic device controls, debugs, records, or updates the function circuit.

5. The system as claimed in claim 4, wherein the selector provides the input signal to the controller when the select signal indicates that the identification code corresponds to the controller, and the selector provides the input signal to the function circuit when the select signal indicates that the identification code corresponds to the function circuit.

6. The system as claimed in claim 4, wherein the I/O port is one of a serial port, a parallel port, a PS/2 port and a game port.

7. The system as claimed in claim 6, wherein the function circuit is a serial peripheral interface flash memory, a joint test action group circuit or a universal asynchronous receiver/ transmitter.

8. A control method for an electronic system, comprising: receiving a first input signal generated by an external electronic device via an I/O port of the electronic system, wherein the I/O port is coupled to an integrated circuit; detecting an identification code of the first input signal from the I/O port; selectively providing the first input signal to a controller or a function circuit via a selector coupled to the I/O port according to the detected identification code of the first input signal; and detecting whether the first input signal has a check code before detecting the identification code of the first input signal; wherein when the first input signal is directed to the function circuit, the function circuit is accessed by the external electronic device; when the first input signal is directed to the controller, the controller processes the first input signal to execute a corresponding operation; and wherein when the function circuit is accessed by the external electronic device, the external electronic device controls, debugs, records, or updates the function circuit.

9. The control method as claimed in claim 8, further comprising:
receiving a second input signal via the I/O port of the electronic system;
determining whether the second input signal has a specific check code; and
providing the second input signal to pre-selected functional circuit or controller when the second input signal does not have the specific check code.

10. The control method as claimed in claim 9, further comprising:
detecting an identification code of the second input signal when the second input signal has the specific check code; and
selectively providing the second input signal to the controller or the function circuit according to the detected identification code of the second input signal.

11. The system as claimed in claim 4, wherein the integrated circuit is a super I/O chip.

12. The integrated circuit as claimed in claim 1, wherein the signal detector receives a second input signal with a second identification code after the external electronic device completes accessing the function circuit, the selector is controlled to transmit the second input signal to the controller and a connection between the function circuit and the I/O port is disconnected.

13. The system as claimed in claim 4, wherein the signal detector receives a second input signal with a second identification code after the external electronic device completes accessing the function circuit, the selector is controlled to transmit the second input signal to the controller and a connection between the function circuit and the I/O port is disconnected.

14. The control method as claimed in claim 8, wherein the signal detector receives a second input signal with a second identification code after the external electronic device completes accessing the function circuit, the selector is controlled to transmit the second input signal to the controller and a connection between the function circuit and the I/O port is disconnected.

* * * * *